United States Patent
Ku et al.

(10) Patent No.: US 8,194,825 B2
(45) Date of Patent: Jun. 5, 2012

(54) METHODS AND APPARATUS FOR CALL SURVEILLANCE IN INTERNET PROTOCOL COMMUNICATION NETWORKS

(75) Inventors: Bernard Ku, Austin, TX (US); Alexander Huang, Austin, TX (US); Armstrong Soo, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1295 days.

(21) Appl. No.: 11/857,241

(22) Filed: Sep. 18, 2007

(65) Prior Publication Data

US 2009/0074156 A1 Mar. 19, 2009

(51) Int. Cl.
*H04M 1/24* (2006.01)
*H04M 3/08* (2006.01)
*H04M 3/22* (2006.01)
(52) U.S. Cl. ...................................... 379/35; 379/32.01
(58) Field of Classification Search .... 379/32.01–32.04, 379/35, 7

See application file for complete search history.

(56) References Cited

U.S. PATENT DOCUMENTS

| | | | |
|---|---|---|---|
| 6,229,887 B1 | 5/2001 | Albers et al. | |
| 6,553,025 B1 | 4/2003 | Kung et al. | |
| 6,654,589 B1 | 11/2003 | Haumont | |
| 6,963,739 B2 | 11/2005 | Dorenbosch et al. | |
| 6,987,849 B2 | 1/2006 | Ravishankar | |
| 7,092,493 B2 * | 8/2006 | Hou et al. | 379/35 |
| 7,155,207 B2 | 12/2006 | Chapman et al. | |
| 2004/0165709 A1 * | 8/2004 | Pence et al. | 379/201.01 |
| 2006/0248586 A1 | 11/2006 | Delaney et al. | |
| 2007/0121812 A1 | 5/2007 | Strange et al. | |

* cited by examiner

*Primary Examiner* — Quoc D Tran
(74) *Attorney, Agent, or Firm* — Hanley, Flight, & Zimmerman, LLC

(57) ABSTRACT

Methods and apparatus for call surveillance in Internet protocol communication networks are disclosed. An example method to perform call surveillance in a communication network disclosed herein comprises determining an overall path delay measurement associated with using a first media server to perform surveillance of a call between a first user device and a second user device in an Internet Protocol Multimedia Subsystem network, and determining whether to perform surveillance of the call with one of the first media server or a second media server based on the overall path delay measurement.

15 Claims, 9 Drawing Sheets

METHODS AND APPARATUS FOR CALL SURVEILLANCE IN INTERNET PROTOCOL COMMUNICATION NETWORKS

FIELD OF THE DISCLOSURE

This disclosure relates generally to communication networks and, more particularly, to methods and apparatus for call surveillance in Internet protocol communication networks.

BACKGROUND

The Communications Assistance for Law Enforcement Act (CALEA) requires telecommunications providers to assist law enforcement in the performance of electronic surveillance pursuant to a court order or other lawful authorization. For example, CALEA mandates that a telecommunications provider design and implement its communication network(s) such that, with proper authorization, calls associated with a targeted device in the network may be monitored. In a typical implementation, a call between a target device and a far-end device is monitored by routing the media or other data streams between the two devices through a monitoring device or other monitoring function.

DETAILED DESCRIPTION

Figure 1A:
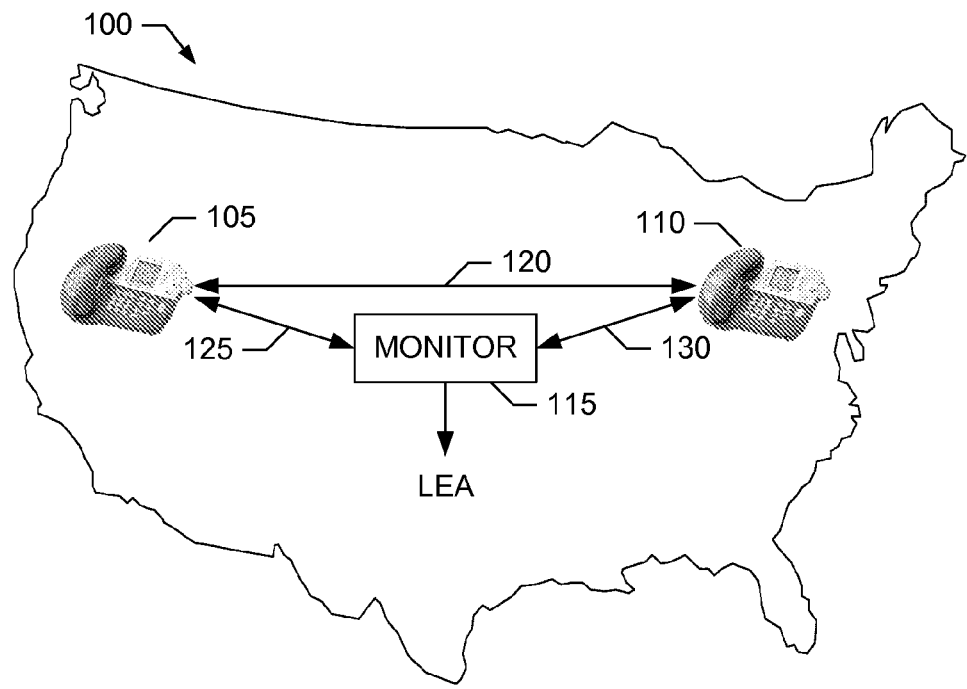
FIGS. 1A-1B are graphical illustrations of path delays associated with two example call monitoring scenarios.
Figure 1B:
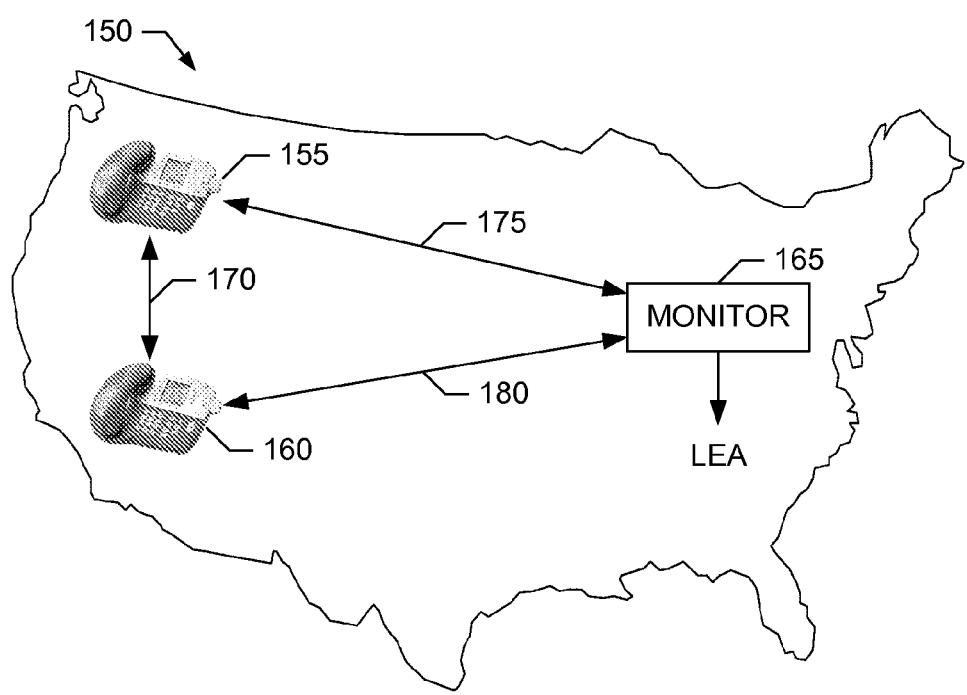

To provide context for the methods and apparatus for call surveillance disclosed herein, two example scenarios of call surveillance in a communication network are illustrated in FIGS. 1A-1B. In the first example scenario 100 of FIG. 1A, an example target user device 105 has been properly selected to undergo authorized electronic surveillance. As such, calls associated with the target device 105, such as a call between the target device 105 and an example far-end user device 110, may be monitored by an example call monitor 115. For example, the call monitor 115 may be interposed between the target device 105 and far-end user device 110 to monitor, for example, control and/or data (e.g., media) streams comprising the call between the two devices. The call monitor 115 may then copy or otherwise extract surveillance information from the monitored control and/or data (e.g., media) streams for transmission to one or more authorized Law Enforcement Agencies (LEAs).

Turning to the illustrated example of FIG. 1A, in the absence of call monitoring, the call would be routed between the target device 105 and the far-end device 110 via a communication path 120 as shown. However, in the presence of call monitoring, the call between the target device 105 and the far-end device 110 is routed through the call monitor 115 via, for example, communication paths 125 and 130. In the illustrated example, the communication path 125 communicatively couples the target device 105 to the call monitor 115, whereas the communication path 130 communicatively couples the far-end device 110 to the call monitor 115. Such a configuration enables the call monitor 115 to monitor the control and/or data (e.g., media) streams exchanged between the target device 105 and the far-end device 110 via the communication paths 125 and 130.

Although such a configuration enables call monitoring, interposing the example call monitor 115 via the communication paths 125 and 130 can increase the total communication delay between the target device 105 and the far-end device 110. In the absence of call monitoring, the primary contributor to the total communication delay between the target device 105 and the far-end device 110 would be the path delay of the communication path 120. The path delay of the communication path 120 includes the propagation delay of electrical signals over the transmission medium as well as the processing delay(s) associated with the network elements that comprise the communication path 120.

However, in the presence of call monitoring, the contributors to the total communication delay between the target device 105 and the far-end device 110 now include the path delays of the communication paths 125 and 130, as well as the processing delay associated with the call monitoring functionality implemented by the call monitor 115. Mathematically, the total communication delay is represented by the expression in Equation 1, which is:

$$D = D_M + D_P,  \quad\quad\quad \text{Equation 1}$$

In Equation 1, D is the total communication delay between, for example, the target device 105 and the far-end device 110; $D_M$ is the processing delay associated with call monitoring performed by, for example, the call monitor 115; and $D_P$ is the overall path delay of the communication paths routing the call between, for example, the target device 105 and the far-end device 110. In the illustrated example of FIG. 1A, the overall path delay, $D_P$, is the sum of the individual path delays associated with the communication paths 125 and 130, which may be represented mathematically by the expression in Equation 2, which is:

$$D_P = D_{P,125} + D_{P,130}. \quad\quad\quad \text{Equation 2}$$

In Equation 2, $D_P$ is the overall path delay; $D_{P,125}$ is the path delay associated with the communication path 125 and $D_{P,130}$ is the path delay associated with communication path 130.

In many, if not most, circumstances, the overall path delay, $D_P$, is the primary contributor to the total communication delay, D. As such, the overall path delay, $D_P$, may impact the performance of calls between, for example, the target device 105 and the far-end device 110. In particular, call setup performance may degrade as the overall path delay, $D_P$, between the target device 105 and the far-end device 110 increases. Such degradation in call setup performance may be manifested as an increase in the delay from first initiating a call to successful connection of the call. A noticeable increase in the call setup delay may, for example, alert a user of the target device 105 to the call monitoring being performed by the call monitor 115. If alerted, the user may disconnect the call prior to or just after call setup completes, thereby thwarting efforts to conduct electronic surveillance of the target device 105.

In the illustration of FIG. 1A, using the communication paths 125 and 130 instead of the communication path 120 to route the call between target device 105 and the far-end device 110 may seem to be a relatively minor routing deviation resulting in a relatively insignificant (e.g., unnoticeable) increase in the overall path delay. However, under some circumstances, inserting the monitoring device or other processing function in the call's media and/or data streams can cause a significant increase in the overall path delay between the target device 105 and far-end device 110. The increased call setup time resulting from such an increased path delay may cause the target device's user to suspect that his or her call is being monitored. In response, the user may disconnect the call before any meaningful surveillance can be performed. For example, the second example scenario of call surveillance in a communication network depicted in FIG. 1B demonstrates how interposing a call monitor between two user devices can result in a relatively significant (e.g., noticeable) overall path delay. In the second example scenario 150 of FIG. 1B, an example target user device 155 has been properly selected to undergo authorized electronic surveillance. As such, calls associated with the target device 155, such as a call between the target device 155 and an example far-end user device 160, may be monitored by an example call monitor 165 in a manner similar to the call monitoring performed by the example call monitor 115 of FIG. 1A.

In the illustrated example of FIG. 1B, in the absence of call monitoring, the call would be routed between the target device 155 and the far-end device 160 via a communication path 170 as shown. However, in the presence of call monitoring, the call between the target device 155 and the far-end device 160 is routed through the call monitor 165 via, for example, communication paths 175 and 180. In the illustrated example, the communication path 175 communicatively couples the target device 155 to the call monitor 165, whereas the communication path 180 communicatively couples the far-end device 160 to the call monitor 165. Such a configuration enables the call monitor 165 to monitor the control and/or data (e.g., media) streams exchanged between the target device 155 and the far-end device 160 via the communication paths 175 and 180.

However, unlike the relatively minor routing deviation associated with using the communication paths 125 and 130 instead of the communication path 120 to route the call in the example of FIG. 1A, using the communication paths 175 and 180 instead of the communication path 170 to route the call in the example of FIG. 1B is a relatively major routing deviation. Such a major routing deviation can result in a relatively significant (e.g., noticeable) increase in the overall path delay for the monitored call. In the illustrated example of FIG. 1B, the overall path delay, $D_P$, is the sum of the individual path delays associated with the communication paths 175 and 180, which may be represented mathematically by the expression in Equation 3, which is:

$$D_P = D_{P,175} + D_{P,180}. \qquad \text{Equation 3}$$

In Equation 3, $D_P$ is the overall path delay; $D_{P,175}$ is the path delay associated with the communication path 175 and $D_{P,180}$ is the path delay associated with communication path 180. In the illustrated example of FIG. 1B, each of the path delays $D_{P,175}$ and $D_{P,180}$ associated with the communication paths 175 and 180, respectively, may be greater than the path delay associated with the more direct path 170 between the target device 155 and the far-end device 160. Continuing with this example, in the presence of monitoring, the overall path delay, D, between the target device 155 and the far-end device 160 can be significantly greater than the path delay associated with the more direct path 170 (e.g., more than twice in this example). Such a significant increase in path delay may be noticeable to a user during call setup, causing the user to terminate the call to thwart any attempts at call surveillance.

As the two example scenarios of FIGS. 1A-1B illustrate, electronic surveillance in a communication network may result in an increase in the path delays for calls being monitored. Furthermore, these two example scenarios demonstrate how susceptible path delays are to the location (e.g., logical and/or physical) of the call monitor relative to the target and far-end devices being monitored. With this in mind, the methods and apparatus disclosed herein operate to decrease and/or reduce the variability of the path delays for calls being monitored in a communication network.

Figure 2:
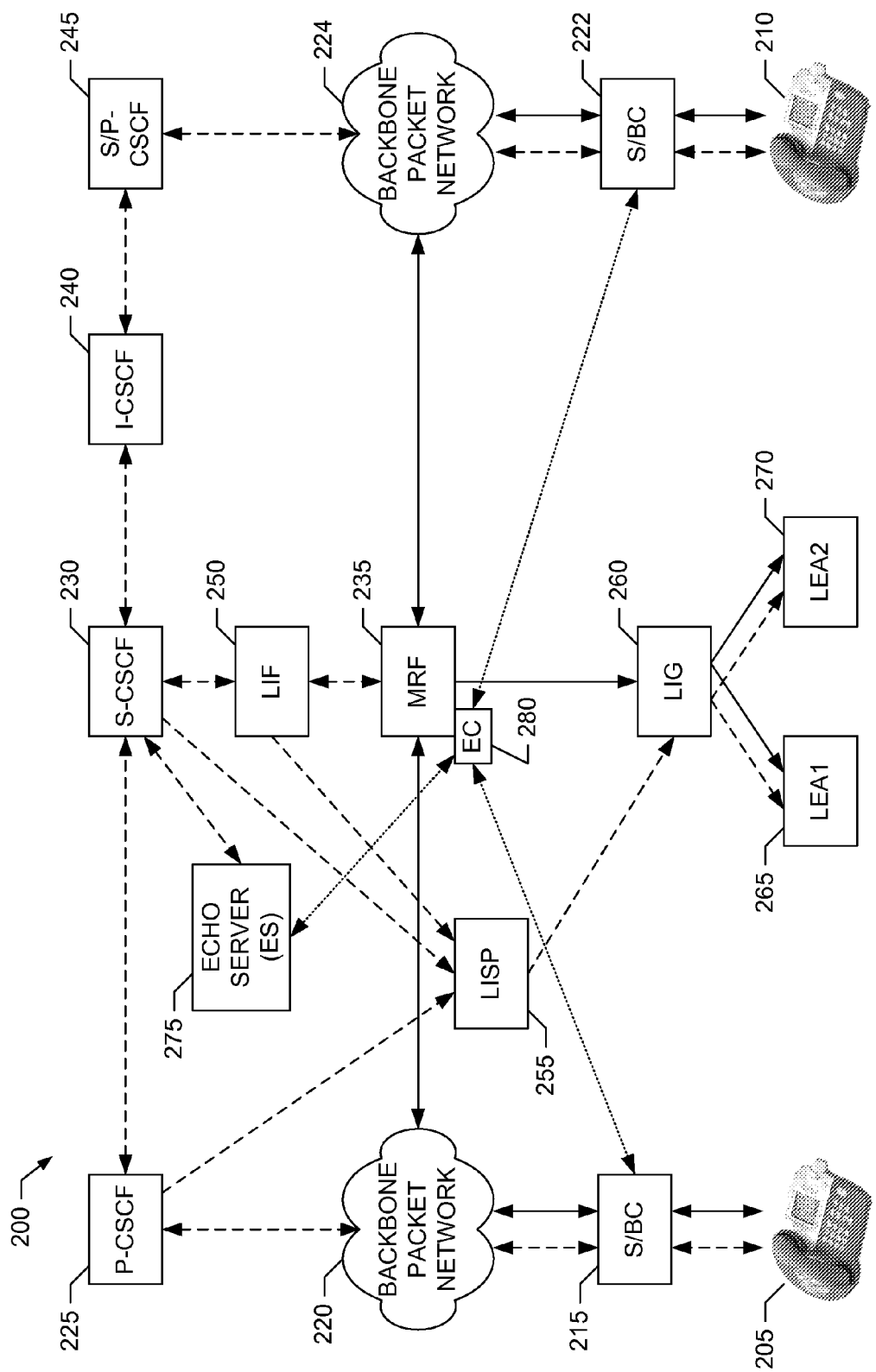
FIG. 2 is a block diagram of a first example Internet Protocol (IP) Multimedia System (IMS) communication network capable of performing call monitoring

A block diagram of a first example communication network 200 implementing electronic surveillance according to the methods and apparatus disclosed herein is shown in FIG. 2. The example communication network 200 implements an Internet Protocol (IP) Multimedia Subsystem (IMS) network and includes various call processors and servers to, for example, manage calls and sessions, provide multimedia functionality, etc., for user devices (also known as User Endpoints (UEs) or Customer Premises Equipment (CPE)), such as the target user device 205 and the far-end user device 210 shown in FIG. 2. In the illustrated example, both the target user device 205 and the far-end user device 210 are IP devices operating in an IP-based network. IMS networks may be used in a variety of applications, such as, for example, to implement mobile communication networks, Voice over Internet Protocol (VoIP) communication networks, etc. Although the illustrated example depicts the communication network 200 as an IMS network, the example electronic surveillance methods and apparatus disclosed herein are not limited to application only in IMS networks. For example, the electronic surveillance methods and apparatus disclosed herein may be readily adapted for use in any communication network facilitating communication between user devices.

To implement an IMS network, the example communication network 200 includes a first Session Border Controller (S/BC) 215 to interface the target user device 205 to a first backbone packet network 220 implementing the example IMS network 200. The example IMS network 200 also includes a second S/BC 222 to interface the far-end user device 210 to a second backbone packet network 224 implementing the example IMS network 200. The S/BCs 215 and 222 provide control over the signaling and/or media streams involved in setting up, conducting, and tearing down calls. The backbone packet networks 220 and 224 may be implemented by separate packet networks or by a common packet network.

The example communication network 200 also includes a Proxy Call Session Control Function (P-CSCF) 225 which may be implemented by one or more servers programmed with machine readable instructions. Each such server may include one or more processors for executing instructions stored in a machine readable memory. Generally, P-CSCFs are call processors that provide an interface for routing signaling messages to appropriate destinations in an IMS network. In the illustrated example, the P-CSCF 225 provides a Session Initiation Protocol (SIP) proxy interface for signaling messages between, for example, the target user device 205 and the rest of the communication network 200. P-CSCF 225 is assigned to the target user devices 205 when it initially registers with the communication network 200. After assignment, the P-CSCF 225 routes signaling messages from the user devices 205 to the appropriate destination(s) in the example communication network 200. Additionally, the P-CSCF 225 of the illustrated example implements call monitoring functionality to support authorized electronic surveillance as described in greater detail below.

Continuing with the description of FIG. 2, the example communication network 200 includes an example Serving CSCF (S-CSCF) 230 to allow, for example, the target user device 205 to register with the example IMS communication network 100. Furthermore, the S-CSCF 230 implements call setup/teardown and provides access to, for example, a media server 235 which provides media-related call functionality. The S-CSCF 230 may be implemented by one or more servers programmed with machine readable instructions, and each such server may include one or more processors for executing instructions stored in a machine readable memory. Generally, S-CSCFs are call processors that act as registrars for registering user devices with an IMS network. S-CSCFs also route signaling messages to appropriate network elements and media servers in an IMS network to implement call setup and teardown. Additionally, the S-CSCF 230 of the illustrated example implements call monitoring functionality to support authorized electronic surveillance as described in greater detail below.

As already mentioned, the example media server 235 implements media-related call processing functionality. The media server 235 may be implemented by one or more servers programmed with machine readable instructions, and each such server may include one or more processors for executing instructions stored in a machine readable memory. For example, the media server 235 may be implemented as a Media Resource Function (MRF) 235 executing on one or more servers. The MRF 235 may further include an MRF Controller (MRFC) and an MRF Processor (MRFP). In general, an MRFC is a signaling plane node that acts as a SIP agent, whereas an MRFP is a media plane node implementing media-related functionality. In the illustrated example, the media server 235 (or MRF 235) also implements call monitoring functionality to support authorized electronic surveillance as described in greater detail below.

The example communication network 200 also includes an Interrogating CSCF (I-CSCF) 240 and another P- and/or S-CSCF (P/S-CSCF) 245. The I-CSCF 240 and/or the P/S-CSCF 245 may be implemented by one or more servers programmed with machine readable instructions, and each such server may include one or more processors for executing instructions stored in a machine readable memory. Generally, I-CSCFs are call processors that serve as points of contact in a user device's home network domain when the user device is originating a call from a visited domain. I-CSCFs also serve as points of contact for call originations which are destined for user devices operating in the network domain served by the particular I-CSCF.

In addition to the P-CSCF 225, the S-CSCF 230 and the MRF 235 previously mentioned, the example communication network 200 further includes an example Lawful Intercept Function (LIF) 250, an example Lawful Intercept System Process (LISP) 255, and an example Lawful Intercept Gateway (LIG) 260 to implement call surveillance (e.g., in compliance with CALEA) according to the methods and apparatus disclosed herein. In the illustrated example, the P-CSCF 225 and S-CSCF 230 are adapted to initiate call monitoring by inserting the LIF 250 in a call involving an authorized surveillance target, such as the target user device 205. The example LIF 250 is a SIP functional element which establishes SIP dialogs with media servers to implement call monitoring. For example, the LIF 250 of the illustrated example will establish a SIP dialog with the media server 235 (or MRF 235) to insert the media server 235 in the media streams associated with the target user device 205 undergoing surveillance. The media server 235 (or MRF 235), in turn, is adapted to support replication of the media stream(s) comprising the monitored call associated with the target user device 205. Additionally, the media server 235 (or MRF 235) of the illustrated example is configured to detect Dual-Tone Multi-Frequency (DTMF) digits present in the media stream(s) comprising the monitored call. The media server 235 (or MRF 235) reports the Call Content (CC) data represented by the replicated media stream(s) and/or detected DTMF digits to the LIG 260.

The LISP 255 of the illustrated example provides a central interface for collecting Call Identifying Information (CII) for reporting to the LIG 260. The CII data collected by the LISP 255 may be provided by the P-CSCF 225, the S-CSCF 230 and/or the LIF 250 by extraction of the relevant call control information included in the SIP messages routed through these network elements. The LIG 260, in turn, receives the CII information from the LISP 255 and the CC data from the media server 235 (or MRF 235) for reporting to authorized Law Enforcement Agencies (LEAs), such as the LEAs 265 and 270 depicted in FIG. 2. For example, the LIG 260 may be configured to provide centralized provisioning of target devices undergoing surveillance, to support multiple network switching elements, to convert CII and CC data to appropriate protocol formats required by various LEAs, etc.

In general, an IMS network, such as the example communication network 200, will include multiple media servers 235 (or MRFs 235) distributed throughout the network. Referring to the example call surveillance scenarios 100 and 150 of FIGS. 1A-1B, it would be desirable to select media servers 235 (or MRFs 235) for call monitoring which reduce the overall path delay between, for example, the target user device 205 under surveillance and the far-end user device 210. Through selection of an appropriate media server 235 (or MRF 235), the overall path delay can be reduced to a relatively insignificant increase over an unmonitored communication path, thereby reducing the likelihood that any call monitoring will be detected by a user of, for example, the target user device 205.

To support selection of a media server 235 (or MRF 235) which exhibits an acceptable increase in path delay during call monitoring, the example communication network 200 further includes an Echo Server (ES) 275 and an Echo Client (EC) 280. The EC 280 is associated with the corresponding media server 235 (or MRF 235). Therefore, because there are typically a plurality of media servers 235 in an IMS network (e.g., such as the communication network 200), there will also be a respective plurality of ECs 280 included in the network.

In the example communication network 200 of FIG. 2, the ES 275 implements a processing function for determining which media server 235 (or MRF 235) to use for monitoring a particular call associated with a particular target user device (e.g., such as the target user device 205). In the illustrated example, the ES 275 makes its media server selection during call setup in response to a request from the S-CSCF 230. Upon receipt of this request, the ES 275 interrogates the ECs 280 associated with the respective media servers 235 included in the communication network 200. In the illustrated example, each EC 280 is responsible for determining an overall path delay between the target user device 205 and the far-end user device 210 that would be incurred if the media server 235 associated with the EC 280 were selected for call monitoring. Furthermore, because both the target user device 205 and the far-end user device 210 are IP devices in an IP network in the illustrated example of FIG. 2, the EC 280 can determine the overall path delay by determining the individual path delays between each device and the media server 235. For example, the EC 280 can perform echo operations, such as pings or User Datagram Protocol (UDP) echoes, to determine measurements representative of the individual path delays between each user device 205, 210 and the media server 235.

Alternatively, and as shown in FIG. 2, the EC 280 can determine the overall path delay by determining the individual path delays between the media server 235 and each S/BC interfaced with its respective user device. For example, the EC 280 can perform one or more echo operations, such as pings or UDP echoes, to determine the path delay between the S/BC 215 and the media server 235 for use as a measurement representative of the individual path delay between the target user device 205 and the media server 235. Similarly, the EC 280 can perform one or more echo operations, such as pings or UDP echoes, to determine the path delay between the S/BC 222 and the media server 235 for use as a measurement representative of the individual path delay between the far-end user device 210 and the media server 235. By measuring the path delays to the S/BCs 215 and 222, instead of directly to the target and far-end user devices 205 and 210, respectively, the echo operations performed by the EC 280 will not be detected by the target and far-end user devices 205 and 210. In this way, there will be no path delay measurement activity at the target and far-end user devices 205 and 210 which may alert either device's user to the possibility that the call is being monitored.

To determine the overall path delay associated with its respective media server 235, the EC 280 then sums the individual path delays. Next, in response to the interrogation(s) from the ES 275, each EC 280 in the network returns the expected overall path delay associated with its respective media server 235. After receiving the overall path delays from the ECs 280, the ES 275 selects an appropriate media server 235 for monitoring the call between the target user device 205 and the far-end user device 210. For example, the ES 275 may be configured to select the media server 235 having the lowest overall path delay, or having the first reported overall path delay which is acceptable according to some specified criteria, such as a predetermined threshold, parameter, etc. The ES 275 then returns information identifying the selected media server 235 (e.g., the "optimal" media server 235 for call monitoring) to the S-CSCF 230 which made the request. The S-CSCF 230, in turn, provides the identification information to the LIF 250 to enable the selected media server 235 to be inserted in the media stream(s) comprising the call. The media server 235 is then able to process the media stream(s) to perform call monitoring as mentioned above and discussed in greater detail below.

Figure 3:
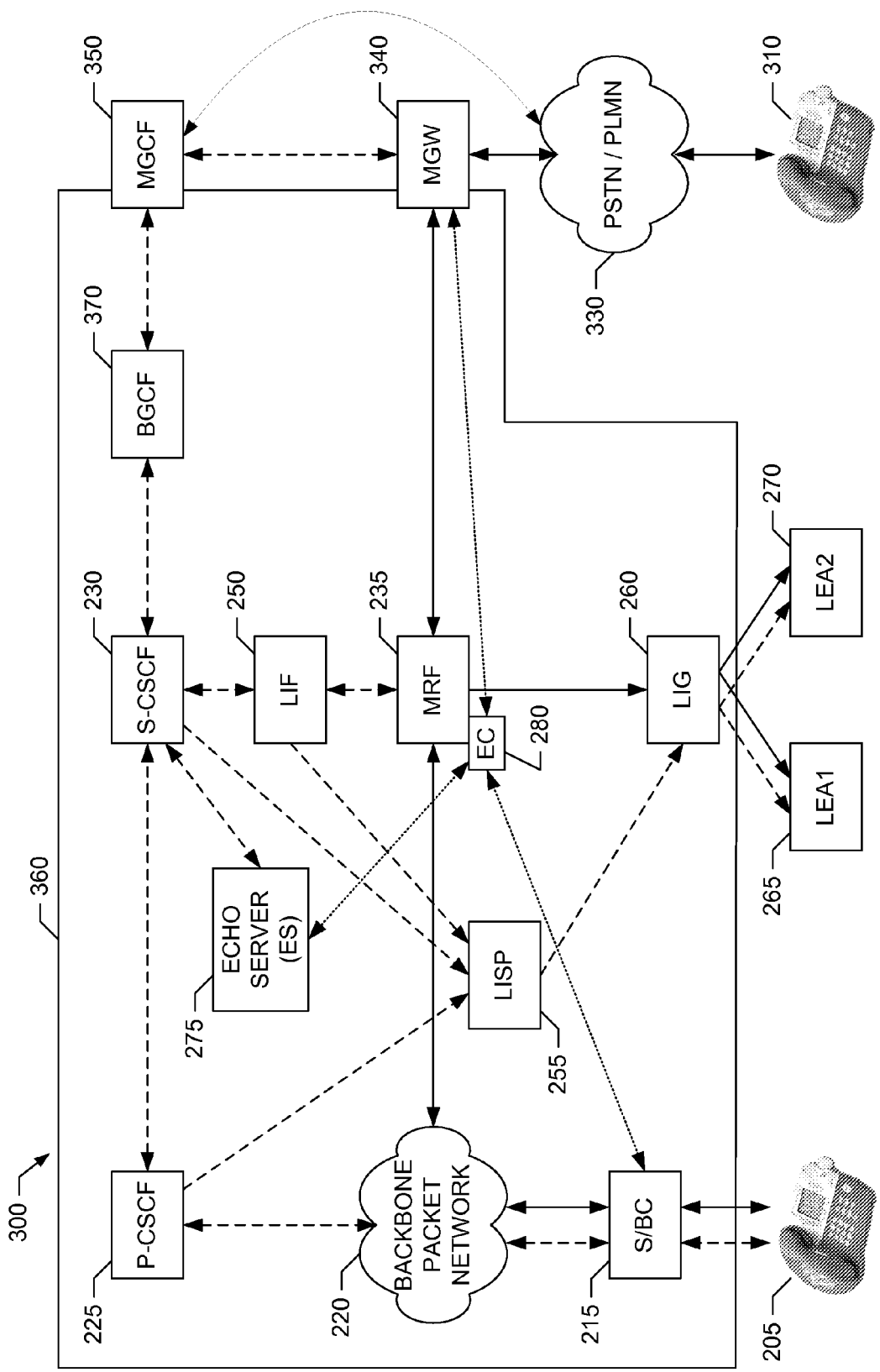
FIG. 3 is a block diagram of a second example IMS communication network capable of performing call monitoring.

A block diagram of a second example communication network 300 implementing electronic surveillance according to the methods and apparatus disclosed herein is shown in FIG. 3. The second example communication network 300 includes many elements in common with the first example communication network 200 of FIG. 2. As such, like elements in FIGS. 2 and 3 are labeled with the same reference numerals. For brevity, the detailed descriptions of these like elements are provided above in connection with the discussion of FIG. 2 and, therefore, are not repeated in the discussion of FIG. 3.

In the illustrated example of FIG. 3, the target user device 205 is an IP device operating in an IP-based network, whereas the far-end device 310 is a device operating in a Public Switched Telephone Network (PSTN) or Public Land Mobile Network (PLMN) 330. For convenience, and without loss of generality, the PSTN/PLMN 330 will be assumed to be a PSTN 330 in the following discussion. To enable the target user device 205 operating in an IP-based network to communicate with the far-end user device 310 operating in the PSTN 330, the communication network 300 includes a Media Gateway (MGW) 340 and a Media Gateway Controller Function (MGCF) 350. In general, MGWs provide interfaces for media plane traffic between the IP and non-IP networks, whereas MGCFs provide interfaces for signaling traffic between IP and non-IP networks.

In the illustrated example, the MGW 340 interfaces media traffic in the IP-based IMS network 360 with non-IP traffic in the PSTN 330. For example, the MGW 340 may be configured to convert Real-time Transport Protocol (RTP) media streams in the IMS network 360 to Pulse Code Modulation (PCM) media streams in the PSTN 330, and vice versa. Additionally, the MGCF 350 interfaces the signaling traffic in the IP-based IMS network 360 with non-IP traffic in the PSTN 330. For example, the MGCF 350 may be configured to convert SIP messages in the IMS network 360 to Integrated Services Digital Network (ISDN) User Part (ISUP) messages in the PSTN 330, and vice versa. Furthermore, the example communication network 300 includes a Breakout Gateway Control Function (BGCF) 370 to determine which of potentially multiple MGCFs 350 and MGWs 340 should be used to route a call from the IMS network 360 to the PSTN 330.

In the illustrated example of FIG. 3, electronic surveillance of the target user device 205 has been authorized. As discussed previously in connection with FIG. 2, the ES 275 is responsible for determining an appropriate media server 235 to monitor a particular call associated with the target user device 205, such as, for example, a call between the target user device 205 and the far-end device 310. To make its determination, the ES 275 interrogates the ECs 280 included in the example communication network 300 to obtain measurements for the overall path delays which would be incurred if their respective media servers 235 were selected for call monitoring.

In the example of FIG. 3, however, because the far-end user device 310 is not an IP devices in an IP network, the EC 280 does not have direct access to the far-end user device 310 for determining the individual path delay between it and the media server 235. Therefore, to determine a measurement representative of the individual path delay between the far-end user device 310 and the media server 235, the EC 280 of the illustrated example determines, instead, a path delay between the media server 235 and the MGW 340 interfacing the far-end user device 310 with the IMS network 360. In other words, the path delay between the MGW 340 and the media server 235 is used as a proxy for the individual path delay between the far-end user device 310 and the media server 235. In many circumstances, using the path delay between the MGW 340 and the media server 235 is an appropriate alternative to the actual individual path delay for the far-end user device 310 because the path delay through the PSTN 330 will be negligible relative to the remaining contributors to the path delay, and/or is a relatively constant factor affecting many, if not all, of the media servers 235 which could be selected for call monitoring.

To determine the overall path delay associated with its respective media server 235, the EC 280 sum the individual path delay associated with the target user device 205 with the path delay associated with the MGW 340. As discussed above in connection with FIG. 2, the individual path delay associated with the target user device 205 may be measured as the delay to the device itself or, alternatively, to the S/BC 215 interfaced with the target user device 205. Then, in response to the interrogation(s) from the ES 275, each EC 280 in the network returns the expected overall path delay associated with its respective media server 235. As discussed above in connection with FIG. 1, after receiving the overall path delays from the ECs 280, the ES 275 selects an appropriate media server 235 for monitoring the call between the target user device 205 and the far-end device 310. The selected (e.g., "optimal") media server 235 is then inserted in the media stream(s) between the target user device 205 and the far-end user device 310 via signaling and configuration messages from the S-CSCF 230 and the LIF 250.

Figure 4:
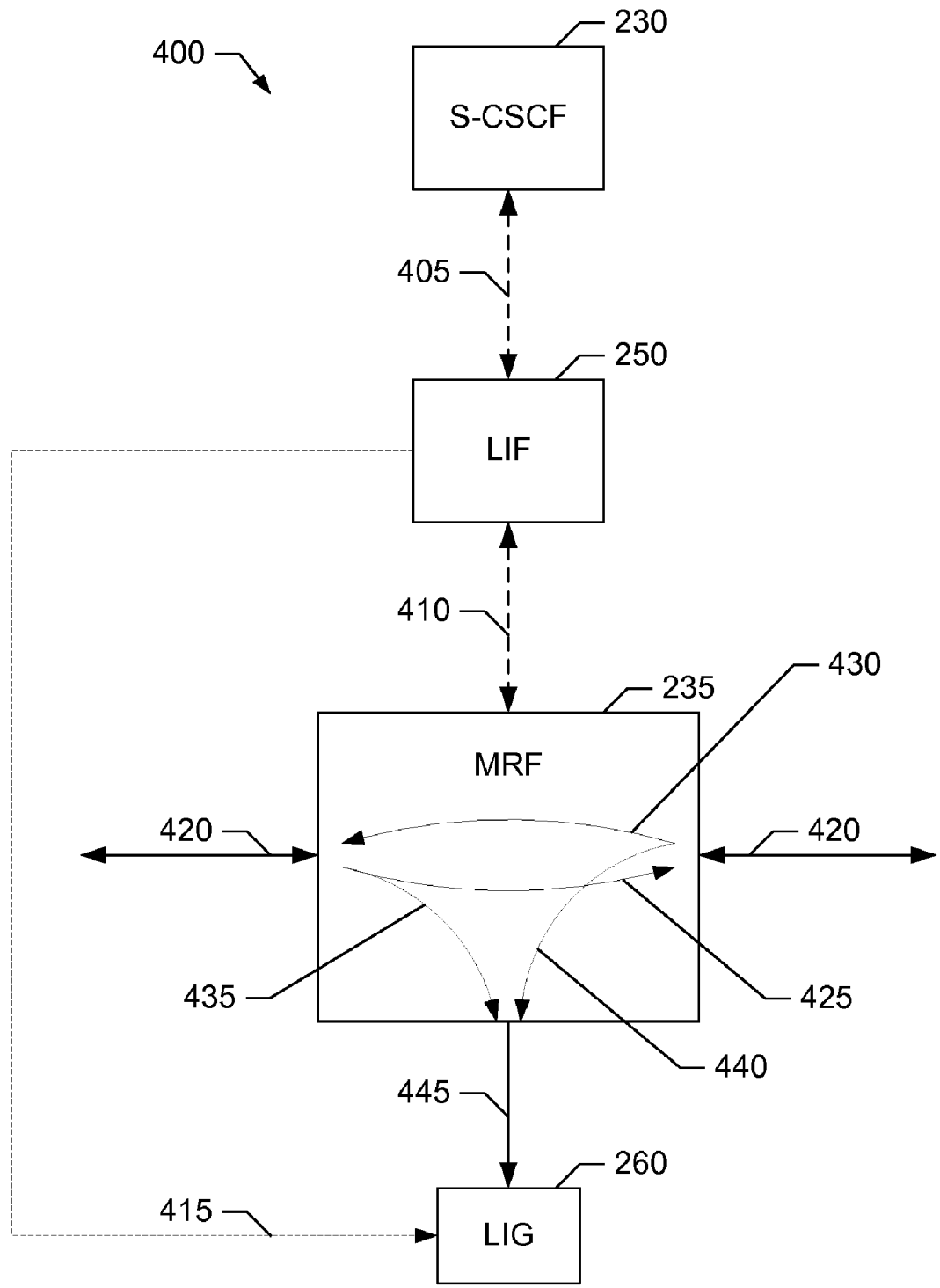
FIG. 4 provides a more detailed view of the network elements responsible for capturing call content for call monitoring in the first and/or second example communication networks of FIGS. 2 and 3, respectively.

A more detailed example view 400 of the network elements responsible for capturing call content to monitor calls in the example communication networks 200 and/or 300 of FIGS. 2 and 3, respectively, is provided in FIG. 4. For clarity, like elements in FIGS. 2, 3 and 4 are labeled with the same reference numerals. In the example view 400 of FIG. 4, the S-CSCF 230 is adapted to include functionality to invoke the LIF 250 via an interface 405 when a target device under authorized surveillance, such as the target user device 205, initiates a call setup or is on the receiving end of a call setup request. Additionally or alternatively, the S-CSCF 230 may be configured to invoke the LIF 250 for non-roaming (e.g., home) target devices, and a P-CSCF (e.g., such as the P-CSCF 225, not shown) may be configured to invoke the LIF 250 for roaming (e.g., visiting) target devices. In an example implementation, the interface 405 used by S-CSCF 230 (and/or, for example, the P-CSCF 225) to invoke the LIF 250 is implemented by a SIP signaling interface.

Upon invocation by the S-CSCF 230 (and/or the P-CSCF 225), the example LIF 250 behaves similarly to a proxy and configures the media server 235 (or MRF 235) via an interface 410 to capture call content for monitoring a call associated with target user device 205. Additionally, the LIF 250 configures the media server 235 via the interface 410 and an interface 415 to report the captured call content to the LIG 260 for subsequent processing and reporting to one or more authorized LEAS (e.g., such as the LEAs 265 and/or 270). In the illustrated example, the interface 410 is implemented by a SIP signaling interface which allows the LIF 250 to establish a SIP dialog to insert the media server 235 in the media stream(s) 420 comprising the monitored call associated with the target user device 205. Furthermore, the LIF 250 of the illustrated example uses the interface 415 to configure the LIG 260 to receive the captured call content from the media server 235. Additionally, the LIF 250 uses the interface 415 to send any other Call Data Channel (CDC) messages to the LIG 260 for reporting to the authorized LEA(s).

In the example view 400 of FIG. 4, the media stream(s) 420 is(are) are implemented by bi-directional, Real-time Transport Protocol (RTP) data stream(s). For example, the media stream 420 includes an upstream RTP data stream 425 from the target user device 205 to a far-end user device, such as the far-end user device 210 of FIG. 2 (or the far-end user device 310 of FIG. 3). The example media stream 420 also includes a downstream RTP data stream 430 from the far-end user device 210 (or 310) to the target user device 205. In the illustrated example, the LIF 250 has inserted the media server 235 in the media stream 420 such that the media server 235 is able to capture call content associated with the upstream RTP data stream 425 and the downstream RTP data stream 430. For example, to capture call content for call monitoring, the media server 235 may replicate the upstream RTP data stream 425 to form a replicated upstream RTP data stream 435, and may replicate the downstream RTP data stream 430 to form a replicated downstream RTP data stream 440. The media server then provides the replicated upstream and downstream RTP data streams 435 and 440 to the LIG 260 via an interface 445 as shown.

Additionally or alternatively, the media server 235 may be configured to process the upstream RTP data stream 425 and/or the downstream RTP data stream 430 to capture specific call content included therein. For example, the media server 235 may be configured to capture DTMF digits transmitted in the upstream RTP data stream 425 and/or the downstream RTP data stream 430 for reporting to the LIG 260. As another example, the media server 235 may be configured to process the upstream RTP data stream 425 and/or the downstream RTP data stream 430 to capture multiple, simultaneous traffic bearers (e.g., such as a simultaneous voice bearer and data bearer) for reporting to the LIG 260

Figure 5:
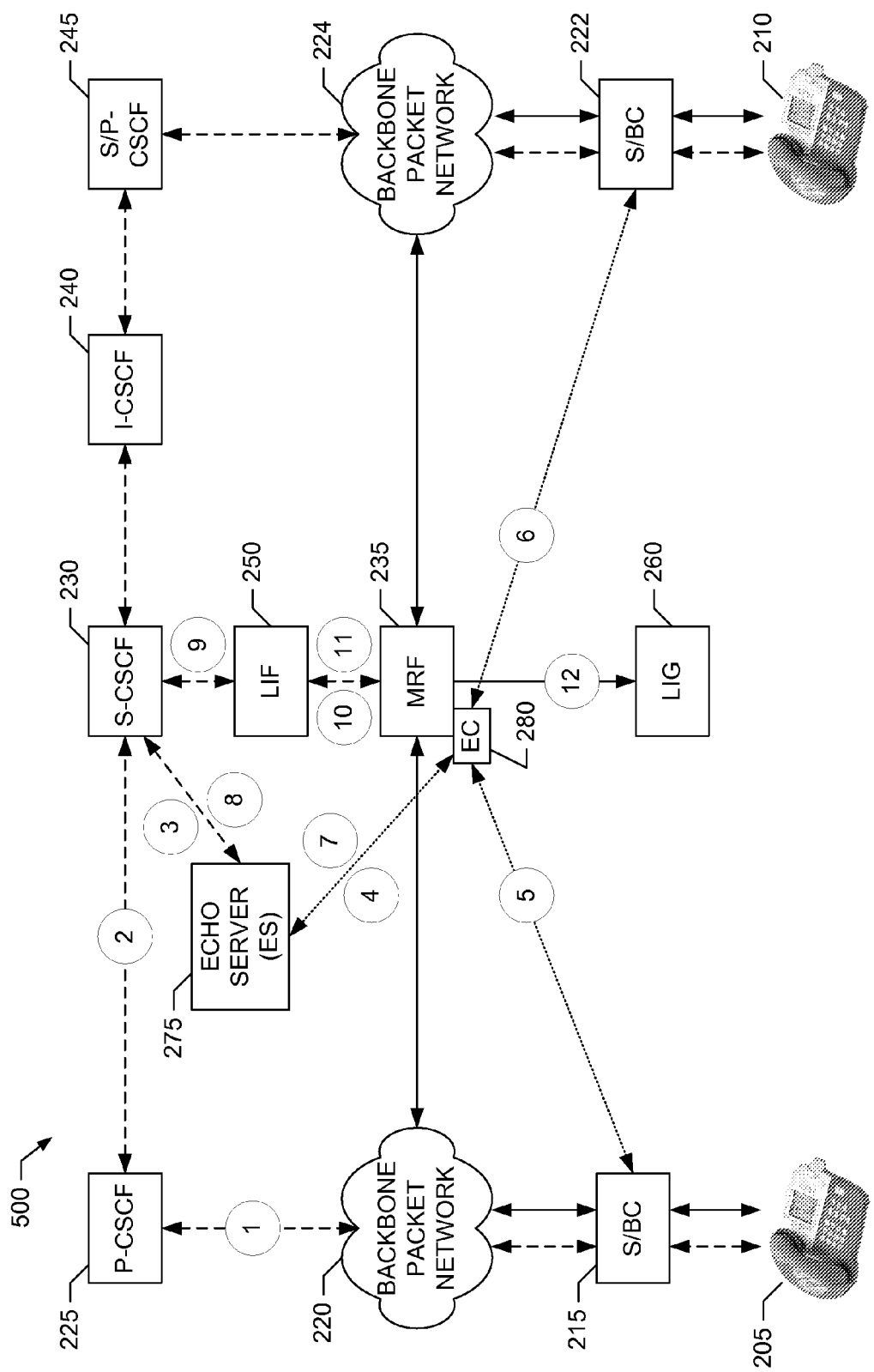
FIG. 5 illustrates an example call flow diagram for configuring call monitoring in the first example communication network of FIG. 2.

An example call flow diagram 500 for configuring call monitoring in the example communication network 200 of FIG. 2 is illustrated in FIG. 5. The example call flow diagram 500 of FIG. 5 depicts some of the elements of the example communication network 200 of FIG. 2. As such, like elements in FIGS. 2 and 5 are labeled with the same reference numerals for clarity. Furthermore, the example call flow diagram 500 depicts, by way of example, a scenario in which the call monitoring is performed in the home network of the target user device 205 and in response to a call origination by the target user device 205. However, the call flow illustrated in the example diagram 500 may be readily adapted to other scenarios, such as, for example, monitoring of the target user device 205 in a visited network, monitoring in response to a call origination by a far-end user device directed to the target user device 205, monitoring performed in the example communication system 300 of FIG. 3 in which the far-end user device 310 is not an IP-based device, etc.

Turning to FIG. 5, the example call flow diagram 500 begins at message block 1 at which the P-CSCF 225 receives a SIP INVITE request from the target user device 205 to originate a call with the far-end user device 210. The P-CSCF 225, in turn, sends a SIP INVITE request to the S-CSCF 230 at message block 2. The S-CSCF 230 processes the received SIP INVITE to determine addressing for the originating device (e.g., the target user device 205) and the destination device (e.g., the far-end user device 210). In the illustrated example, in response to determining that the originating device is the target user device 205 undergoing surveillance, the S-CSCF 230 queries the ES 275 at message block 3 to determine an appropriate media server 235 (or MRF 235) to monitor the call.

Next, in response to the query, the ES 275 interrogates the EC 280 at message block 4 to determine an overall path delay that would be incurred if its respective media server 235 was used for call monitoring. The EC 280, in turn, performs echo operations at message blocks 5 and 6 to compute the overall path delay associated with its respective media server 235. In particular, at message block 5 the EC 280 performs an echo operation, such as a ping or UDP echo, to determine an individual path delay between the media server 235 and the S/BC 215 interfaced with the target user device 205. At message block 6, the EC 280 performs another echo operation, such as a ping or UDP echo, to determine an individual path delay between the media server 235 and the S/BC 222 interfaced with the far-end user device 210. The EC 280 then uses these individual path delays to compute an overall path delay corresponding to the media server 235. The EC 280 returns the computed overall path delay to the ES 275 at message block 7 as a response to the previous interrogation at message block 4.

After receiving the overall path delays from the ECs 280, the ES 275 selects an appropriate media server 235 for monitoring the call between the target user device 205 and the far-end user device 210 as described in greater detail above. The ES 275 then returns an address for the selected media server 235 (e.g., the "optimal" media server 235 for call monitoring) to the S-CSCF 230 at block 8 as a response to the previous query at message block 3. The S-CSCF 230 then sends a SIP INVITE message including the address of the selected (e.g., "optimal") media server 235 to the LIF 250 at message block 9. At message block 10, the LIF 250 sends a SIP INVITE request to the addressed media server 235 to configure the monitoring service of the media server 235. Additionally, the LIF 250 may provide Session Description Protocol (SDP) information concerning the originating device (e.g., the target user device 205) to the message server 235. The message server 235 may also provide SDP information to the LIF 250 as requested. At message block 10, the LIF 250 provides information to allow the media server 235 to forward captured call content, such as replicated media stream(s), detected DTMF digits, etc., to the LIG 260.

As a result of the configuration transactions at message blocks 10 and 11, the message server 235 is inserted in the media stream(s) comprising the call between the target user device 205 and the far-end user device 210. The media server 235 is also configured to capture call content included in the media stream(s) and to forward the captured call content to the LIG 260. Thus, at message block 12, the media server 235 forwards the captured call content, such as replicated media stream(s), detected DTMF digits, etc., to the LIG 260. For example, detected DTMF digits may be reported by the media server 235 using a SIP INFO message for communicating mid-session signaling information.

Figure 6:
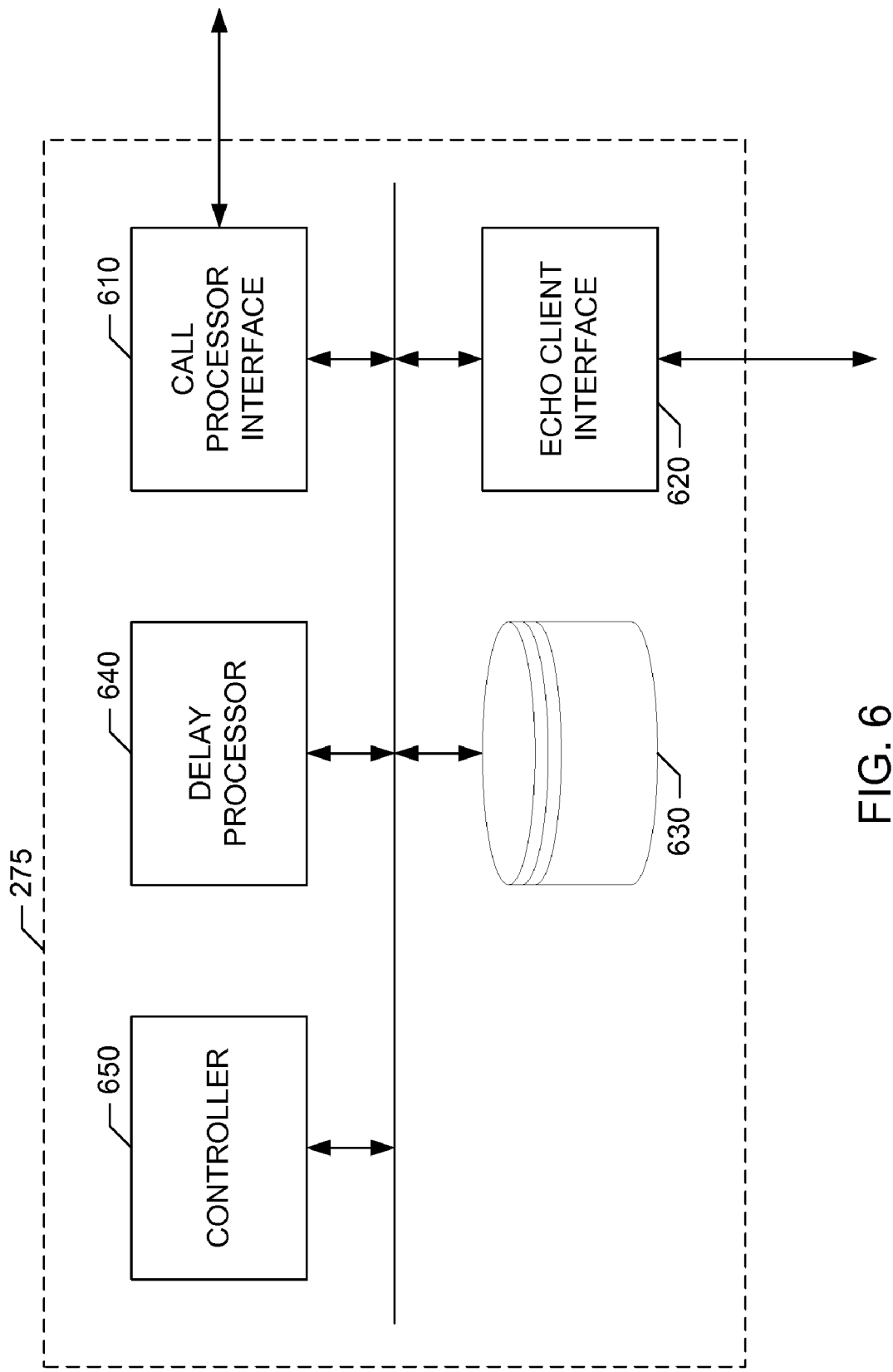
FIG. 6 is a block diagram of an example echo server that may be used to implement the first and/or second example communication networks of FIGS. 2 and 3, respectively.

A block diagram illustrating an example implementation of the ES 275 which may be used to implement the example communication systems 200 and/or 300 of FIGS. 2 and 3, respectively, is shown in FIG. 6. The example ES 275 of FIG. 6 includes a call processor interface 610 configured to interface with one or more call processors in one or more communication networks, such as the S-CSCF 230 included in the example communication networks 200 and/or 300 of FIGS. 2 and 3, respectively. In an example implementation, the call processor interface 610 is implemented by a SIP interface configured to receive queries/requests from the S-CSCF 230 to assign a media server (e.g., such as the media server 235) for call monitoring. Additionally, the example SIP interface implementation of the example call processor interface 610 is configured to send responses to queries/requests from the S-CSCF 230 which include, for example, address information corresponding to the media server (e.g., such as the media server 235) selected by the ES 275 to perform call monitoring.

The example ES 275 of FIG. 6 also includes an echo client interface 620 configured to interface with one or more ECs in one or more communication networks, such as the EC 280 included in the example communication networks 200 and/or 300 of FIGS. 2 and 3, respectively. In the illustrated example, the echo client interface 620 is configured to send an interrogation message to the EC 280 to obtain a measurement of the overall path delay that would be incurred if its respective media server 235 was selected for call monitoring. In a first example implementation, the echo client interface 620 is configured to send a separate interrogation message to each of the one or more ECs 280 in the communication network 200 and/or 300. In a second example implementation, the echo client interface 620 is configured to broadcast an interrogation message that may be received by all or a subset of the one or more ECs 280 in the communication network 200 and/or 300. The echo client interface 620 of the illustrated example is also configured to receive a response from each EC 280 which includes the measured overall path delay and/or other measurements which may be used by the ES 275 to determine the overall path delay for the media server 235 associated with the EC 280. The received overall path delay measurements are stored in a storage unit 630 included in the example ES 275 of FIG. 6. The example storage unit 630 may be implemented by any storage method and/or apparatus including but not limited to, a volatile memory device, a non-volatile memory device, etc.

To perform media server selection based on the overall path delay measurements received from the various ECs 280 in the communication network 200 and/or 300, the example ES 275 of FIG. 6 includes a delay processor 640. The example delay processor 640 is configured to retrieve the overall path delay measurements from the storage unit 630 and to process the overall path delay measurements to determine an appropriate media server 235 for call monitoring. For example, the delay processor 640 may be configured to compare the overall path delay measurements and to select the media server 235 having the lowest overall path delay. Additionally or alternatively, the example delay processor 640 may be configured to compare the overall path delay measurements to some specified criteria, such as a predetermined threshold, parameter, etc., and to select the media server 235 having the first reported overall path delay which is acceptable based on the specified criteria (e.g., without waiting for all ECs to report). The example delay processor 640 may, of course, be configured to use one or more additional or alternative techniques for selecting the appropriate media server 235 for call monitoring based on the overall path delay measurements retrieved from the storage unit 630.

The example ES 275 of FIG. 6 also includes a controller 650. The controller 650 of the illustrated example is configured to control operation of the various elements included in the ES 275, such as, for example, the call processor interface 610, the echo client interface 620, the storage unit 630 and/or the delay processor 640. For example, the controller 650 may initialize the call processor 610 to receive queries/requests from one or more call processors (e.g., such as the S-CSCF 230) in the communication network (e.g., such as the example communication networks 200 and/or 300). The controller 650 may also control to which ECs 280 interrogation messages should be sent via the echo client interface 620. The controller 650 may further determine when the delay processor 640 should process overall path delay measurements from the storage unit 630 and report a selected media server 235 to the requesting call processor (e.g., such as the S-CSCF 230).

Figure 7:
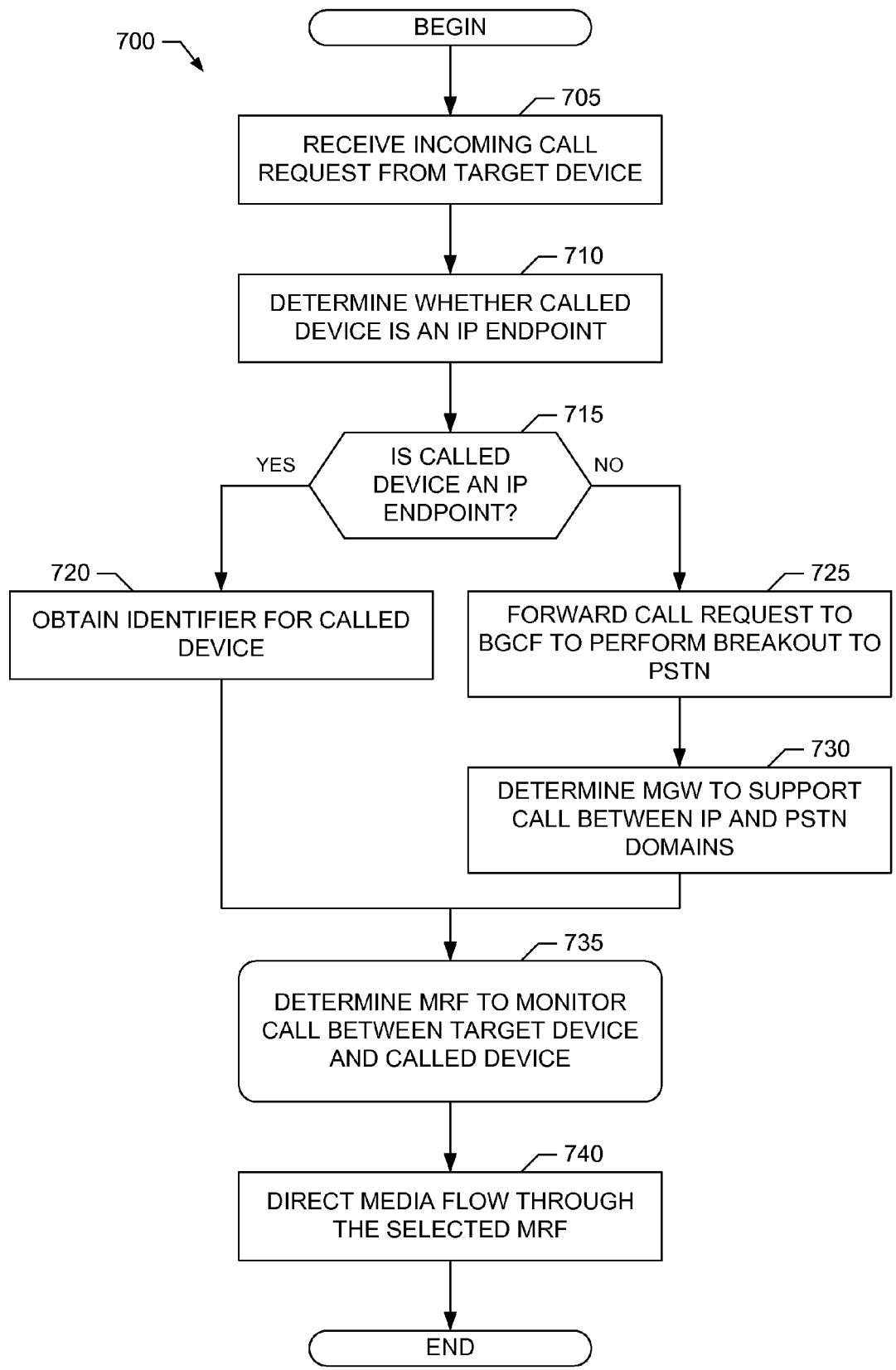
FIG. 7 is a flowchart representative of example machine readable instructions that may be executed to implement call monitoring in the first and/or second example communication networks of FIGS. 2 and 3, respectively.
Figure 8:
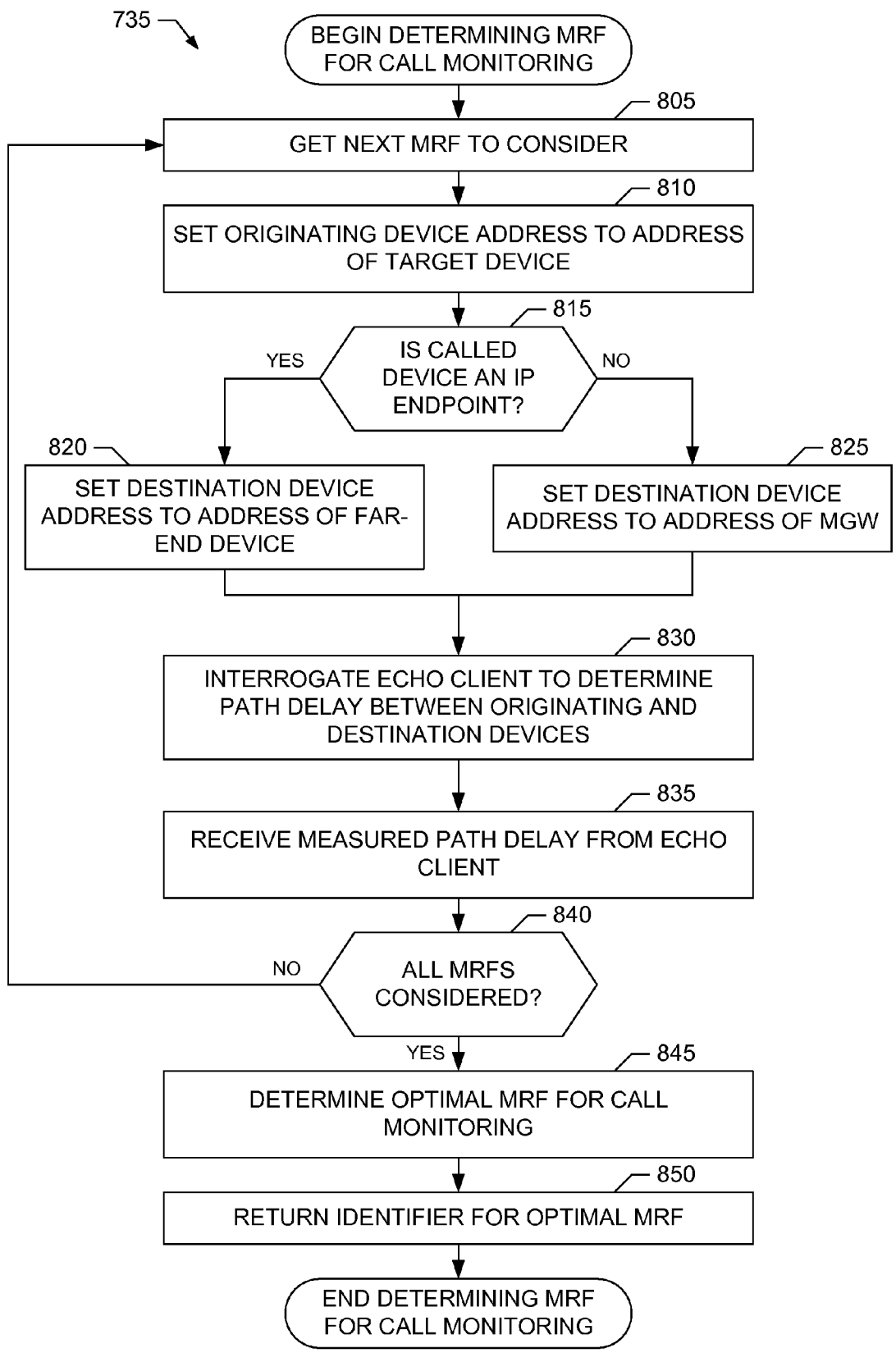
FIG. 8 is a flowchart representative of example machine readable instructions that may be executed to implement the example echo server of FIG. 6 and/or the example machine readable instructions of FIG. 7.

Flowcharts representative of example machine readable instructions that may be executed to implement, at least in part, the example communication network 200, the example communication network 300, the example P-CSCF 225, the example S-CSCF 230, the example media server 235, the example LIF 250, the example LISP 255, the example LIG 260, the example ES 275, the example EC 280, the example call processor interface 610, the example echo client interface 620, the example delay processor 640 and/or the example controller 650 are shown in FIGS. 7-8. In these examples, the machine readable instructions represented by each flowchart may comprise one or more programs for execution by: (a) a processor, such as the processor 912 shown in the example computer 900 discussed below in connection with FIG. 9, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 912, but persons of ordinary skill in the art will readily appreciate that the entire program or programs and/or portions thereof could alternatively be executed by a device other than the processor 912 and/or embodied in firmware or dedicated hardware (e.g., implemented by an Application Specific Integrated Circuit (ASIC), a Programmable Logic Device (PLD), a Field Programmable Logic Device (FPLD), discrete logic, etc.). For example, any or all of the example communication network 200, the example communication network 300, the example P-CSCF 225, the example S-CSCF 230, the example media server 235, the example LIF 250, the example LISP 255, the example LIG 260, the example ES 275, the example EC 280, the example call processor interface 610, the example echo client interface 620, the example delay processor 640 and/or the example controller 650 could be implemented by any combination of software, hardware, and/or firmware. Also, some or all of the machine readable instructions represented by the flowchart of FIGS. 7-8 may be implemented manually. Further, although the example machine readable instructions are described with reference to the flowcharts illustrated in FIGS. 7-8, persons of ordinary skill in the art will readily appreciate that many other techniques for implementing the example methods and apparatus described herein may alternatively be used. For example, with reference to the flowcharts illustrated in FIGS. 7-8, the order of execution of the blocks may be changed, and/or some of the blocks described may be changed, eliminated, combined and/or subdivided into multiple blocks.

Example machine readable instructions 700 that may be executed to implement call monitoring for electronic surveillance in, for example, the communication networks 200 and/or 300 of FIGS. 2 and 3 are shown in FIG. 7. The example machine readable instructions 700 may be executed at predetermined intervals, based on an occurrence of a predetermined event, etc., or any combination thereof. Furthermore, although the example machine readable instructions 700 implement call monitoring in response to a call origination by a targeted user device, the example machine readable instructions 700 may be readily adapted to other scenarios, such as, for example, implementing monitoring in response to a call origination by a far-end user device directed to the targeted user device, etc.

Turning to FIG. 7, the example machine readable instructions 700 begin execution at block 705 at which the S-CSCF 230 receives an incoming call request from the target user device 205 for which electronic surveillance has been authorized. For example, at block 705 the incoming call request may take the form of a SIP INVITE message requesting the Universal Resource Identifier (URI) for the called device (e.g., such as the far-end device 210 or 310) which the target user device 205 is calling. Control then proceeds to block 710 at which the S-CSCF 230 determines whether the called device is an IP-based user device or, in other words, whether the called device is an IP endpoint. For example, at block 710 the S-CSCF 230 may query a tElephone NUmber Mapping (ENUM) server to obtain the SIP URI for the called device included in the SIP INVITE message received at block 705. If a SIP URI is available, the called device is an IP endpoint; otherwise, the called device is operating in an external network, such as, for example, the PSTN 330.

If the called device is an IP endpoint (block 715), control proceeds to block 720 at which the S-CSCF 230 obtains an address for the called device. For example, at block 720 the ENUM server returns the requested SIP URI associated with, for example, the far-end user device 210 to the S-CSCF 230. If, however, the called device is not an IP endpoint (block 715), control proceeds to block 725 at which the S-CSCF 230 forwards the call request to the BGCF 370 to perform a call breakout to the PSTN 330 to setup the call with, for example, the far-end user device 310. Control then proceeds to block 730 at which the BGCF 370 determines which of potentially multiple MGCFs 350 and MGWs 340 should be used to route the call between the IMS network 360 and the PSTN 330 as discussed in greater detail above in connection with FIG. 3.

After the address for the far-end user device 210 is determined at block 720, or the address for the MGW 340 supporting a call with the far-end user device 310 is determined at block 730, control proceeds to block 735. At block 735, the S-CSCF 230 determines an appropriate media server 235 (or MRF 235) for monitoring the call between the target user device 205 and the far-end user device 210 or 310. For example, at block 735 the S-CSCF 230 queries the ES 275 to obtain address information for an appropriate media server 235 to perform call monitoring. The ES 275, in turn, determines the appropriate media server 235 for call monitoring by selecting the media server 235 which will have an acceptable overall path delay between the target user device 205 and the far-end user device 210 or 310. Example machine readable instructions for implementing the processing at block 735 are shown in FIG. 8 and discussed in greater detail below.

After the media server 235 (or MRF 235) to be used for call monitoring is determined at block 735, control proceeds to block 740 at which the S-CSCF 230 directs the call's media flow (e.g., the media flow between the target user device 205 and the far-end user device 210 or 310) through the selected media server 235. For example, at block 740 the S-CSCF 230 invokes the LIF 250 to insert the selected media server 235 in the media stream(s) comprising the call between the target user device 205 and the far-end user device 210 or 310. Additionally, the LIF 250 configures the media server 235 to capture call content included in the media stream(s) and to report the captured call content to the LIG 260 for subsequent processing and reporting to one or more authorized LEAS (e.g., such as the LEAs 265 and/or 270). Execution of the example machine readable instructions 700 then ends.

Example machine readable instructions 735 that may be executed to determine which media server 235 (or MRF 235) to use for call monitoring in, for example, the communication networks 200 and/or 300 of FIGS. 2 and 3 are shown in FIG. 8. The example machine readable instructions 735 may be used to implement the example ES 275 of FIGS. 2-3, 5 and/or 6, and/or the processing performed at block 735 of FIG. 7. Turning to FIG. 8, and referring to the example ES 275 of FIG. 6, execution of the example machine readable instructions 735 begins in response to a request/query received from a call processor (e.g., the S-CSCF 230) via the call processor interface 610 included in the example ES 275. The example machine readable instructions 735 then begin execution at block 805 at which the controller 650 included in the example ES 275 obtains identification (e.g., address) information for the next media server 235 (or MRF 235) being considered to provide call monitoring for a call being setup for the target user device 205. As discussed above, there is typically a plurality of media servers 235 (or MRFs 235) in an IMS network. Therefore, at block 805 the controller 650 gets the next media server 235 (or MRF 235) in the plurality of media servers to evaluate.

Next, control proceeds to block 810 at which the controller 650 included in the ES 275 sets an originating device address to be the address for the target user device 205 or, alternatively, the address of the S/BC 215 interfaced with the target user device 205 (e.g., continuing the example of FIG. 7 in which call monitoring is initiated in response to a call origination by the target user device 205). The originating device address is used to establish an origination endpoint for the measured path delay incurred by the media server 235 under consideration in the event it was selected for call monitoring. Control then proceeds to block 815 at which the controller 650 included in the ES 275 determines whether the called device is an IP endpoint. If the called device is an IP endpoint (block 815), control proceeds to block 820 at which the controller 650 sets a destination device address to be the address for the called device, such as, for example, the far-end user device 210. Alternatively, at block 820, the controller 650 sets the destination device address to be the address for the S/BC interfaced with the called device, such as, for example, the S/BC 222 interfaced with the far-end user device 210. If, however, the called device is not an IP endpoint (block 815), control proceeds to block 825 at which the controller 650 sets the destination device address to be the address for the MGW 340 selected to route calls to the called device, such as, for example, the far-end user device 310. The destination device address set at blocks 820 or 825 is used to establish a destination endpoint for the measured path delay incurred by the media server 235 under consideration in the event it was selected for call monitoring. After the destination address is set at blocks 820 or 825, control proceeds to block 830.

At block 830 the ES 275 interrogates the EC 280 associated with the media server 235 (or MRF 235) under consideration via the echo client interface 620. Included in the interrogation message are the originating device address and destination device address set at blocks 815 and 820 or 825. The EC 280 is configured to use the provided originating device address and destination device address to determine the overall path delay that would be incurred in the event its respective media server 235 (or MRF 235) was selected for call monitoring. For example, the EC 280 may perform a first echo operation, such as a ping or UDP echo, using the originating device address to measure a first path delay between the originating device (e.g., the target user device 205 or the S/BC 215 interfaced with the target user device 205) and the respective media server 235 (or MRF 235). The EC 280 may perform a second echo operation, such as a ping or UDP echo, using the destination device address to measure a second path delay between the destination device (e.g., the far-end user device 210, the S/BC 222 interfaced with the far-end user device 210, or the MGW 340) and the respective media server 235 (or MRF 235). The EC 280 may then determine a measurement for the overall path delay associated with its respective media server 235 (or MRF 235) by summing the first path delay and the second path delay.

Next, control proceeds to block 835 at which the example ES 275 receives the measured overall path delay from the EC 275 via the echo client interface 620. Control then proceeds to block 840 at which the controller 650 included in the example ES 275 determines whether all media servers 235 (or MRFs 235) in the plurality of media servers have been considered for call monitoring. If all media servers 235 (or MRFs 235) have not been considered (block 840), control returns to block 805 and blocks subsequent thereto at which the controller 650 included in the example ES 275 obtains the next media server 235 (or MRF 235) for consideration. If, however, all media servers 235 (or MRFs 235) have been considered (block 840), control proceeds to block 845 at which the delay processor 640 included in the example ES 275 determines the appropriate media server 235 (or MRF 235) to provide call monitoring of the call between, for example, the target user device 205 and the far-end user device 210 or 310.

For example, and as discussed above, at block 845 the delay processor 640 may compare the overall path delay measurements and select the media server 235 (or MRF 235) having a lowest overall path delay (e.g., the "optimal" media server). Additionally or alternatively, blocks 840 and 845 can be modified such that the delay processor 640 compares the overall path delay measurements as they are received to some specified criteria, such as a predetermined threshold, parameter, etc., and selects the first media server 235 (or MRF 235) to report an overall path delay which is acceptable based on the specified criteria. After the delay processor 640 selects an appropriate media server 235 (or MRF 235) at block 845, control proceeds to block 850 at which the example ES 275 returns identification (e.g., address) information for the selected media server 235 (or MRF 235) to the requesting call processor (e.g., the S-CSCF 230) via the call processor interface 610. Execution of the example machine readable instructions 735 then ends.

Figure 9:
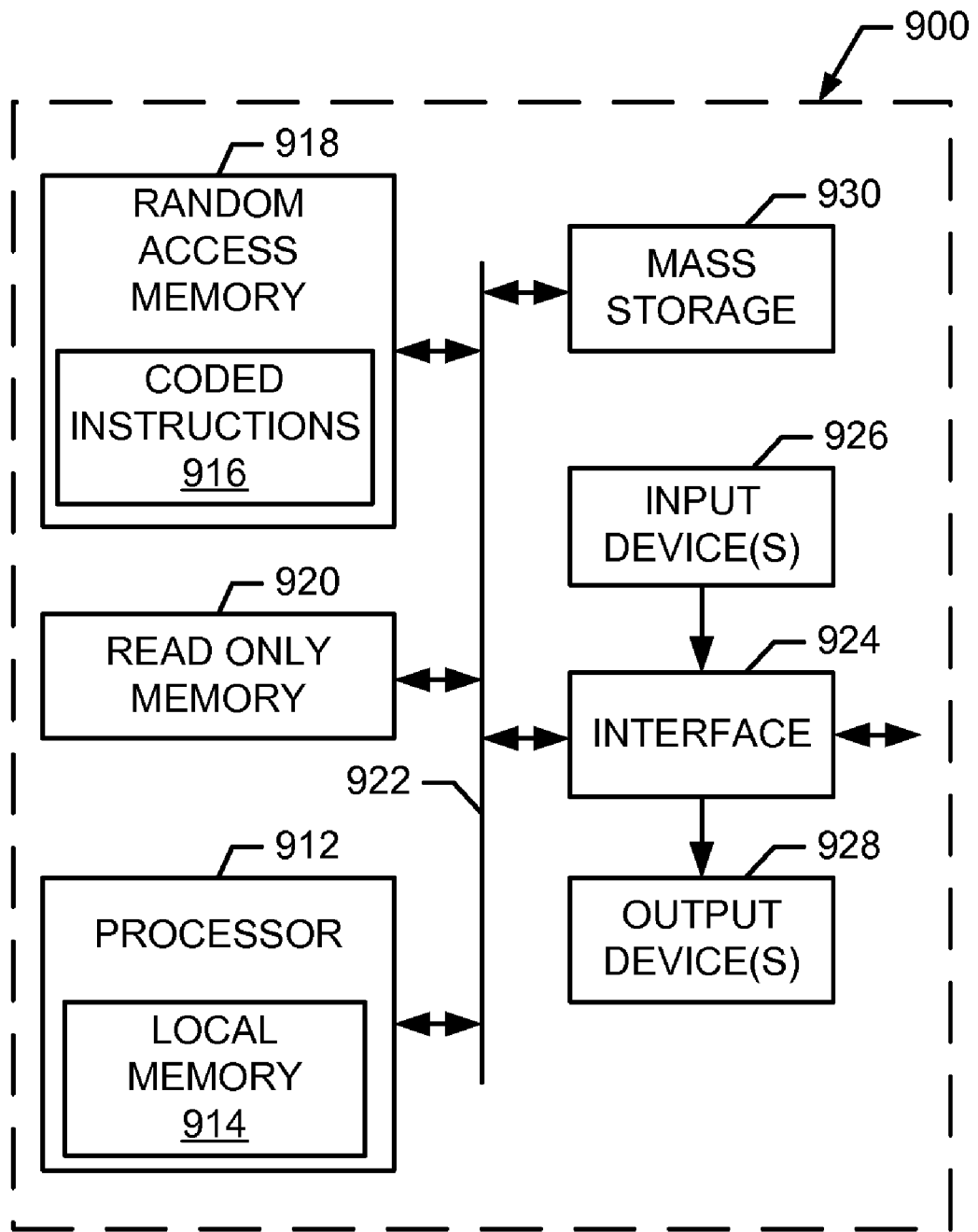
FIG. 9 is a block diagram of an example computer that may execute the example machine readable instructions of FIGS. 7 and/or 8 to implement the first example communication network of FIG. 2, the second example communication network of FIG. 3 and/or the example echo server of FIG. 6.

FIG. 9 is a block diagram of an example computer 900 capable of implementing the apparatus and methods disclosed herein. The computer 900 can be, for example, a server, a personal computer, a Personal Digital Assistant (PDA), an Internet appliance, a DVD player, a CD player, a digital video recorder, a personal video recorder, a set top box, or any other type of computing device.

The system 900 of the instant example includes a processor 912 such as a general purpose programmable processor. The processor 912 includes a local memory 914, and executes coded instructions 916 present in the local memory 914 and/or in another memory device. The processor 912 may execute, among other things, the machine readable instructions represented in FIGS. 7-8. The processor 912 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 912 is in communication with a main memory including a volatile memory 918 and a non-volatile memory 920 via a bus 922. The volatile memory 918 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 920 may be implemented by flash memory and/or any other desired type of memory device. Access to the main memory 918, 920 is typically controlled by a memory controller (not shown).

The computer 900 also includes an interface circuit 924. The interface circuit 924 may be implemented by any type of interface standard, such as an Ethernet interface, a Universal Serial Bus (USB), and/or a 3rd Generation Input/Output (3GIO) interface.

One or more input devices 926 are connected to the interface circuit 924. The input device(s) 926 permit a user to enter data and commands into the processor 912. The input device (s) can be implemented by, for example, a keyboard, a mouse, a touchscreen, a track-pad, a trackball, an isopoint and/or a voice recognition system.

One or more output devices 928 are also connected to the interface circuit 924. The output devices 928 can be implemented, for example, by display devices (e.g., a liquid crystal display, a Cathode Ray Tube display (CRT)), by a printer and/or by speakers. The interface circuit 924, thus, typically includes a graphics driver card.

The interface circuit 924 also includes a communication device such as a modem or network interface card to facilitate exchange of data with external computers via a network (e.g., an Ethernet connection, a Digital Subscriber Line (DSL), a telephone line, coaxial cable, a cellular telephone system, etc.).

The computer 900 also includes one or more mass storage devices 930 for storing software and data. Examples of such mass storage devices 930 include floppy disk drives, hard drive disks, compact disk drives and Digital Versatile Disk (DVD) drives. The mass storage device 930 may implement the example storage unit 630 of FIG. 6. Alternatively, the volatile memory 918 may implement the example storage unit 630.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

This patent contemplate examples wherein a device is associated with one or more machine readable mediums containing instructions, or receives and executes instructions from a propagated signal so that, for example, when connected to a network environment, the device can send or receive voice, video or data, and communicate over the network using the instructions. Such a device can be implemented by any electronic device that provides voice, video and/or data communication, such as a telephone, a cordless telephone, a mobile phone, a cellular telephone, a Personal Digital Assistant (PDA), a set-top box, a computer, and/or a server.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to perform call surveillance in a communication network, the method comprising:
   determining an overall path delay measurement associated with using a first media server to perform surveillance of a call between a first user device and a second user device in an Internet Protocol Multimedia Subsystem network; and
   determining, using a processor, whether to perform surveillance of the call with one of the first media server or a second media server based on the overall path delay measurement.

2. A method as defined in claim 1 wherein determining whether to perform surveillance with one of the first media server or the second media server further comprises selecting the first media server to perform surveillance of the call when the overall path delay measurement indicates that surveillance performed by the first media server will correspond to a lower overall path delay between the first user device and the second user device than surveillance performed by the second media server.

3. A method as defined in claim 1 wherein the overall path delay measurement is a first overall path delay measurement, and determining whether to perform surveillance with one of the first media server or the second media server further comprises selecting the first media server to perform surveillance of the call when the first overall path delay measurement meets one or more criteria and the first overall path delay measurement is obtained before a second overall path delay measurement associated with the second media server.

4. A method as defined in claim 1 wherein the first user device and the second user device are resident in the Internet Protocol Multimedia Subsystem network, the overall path delay measurement comprises a first measurement and a second measurement, the first measurement comprises a first measured echo delay between the first media server and at least one of the first user device or a first session border controller interfaced with the first user device, and the second measurement comprises a second measured echo delay between the first media server and at least one of the second user device or a second session border controller interfaced with the second user device.

5. A method as defined in claim 1 wherein the first user device is resident in the Internet Protocol Multimedia Subsystem network and the second user device is resident in a second communication network external to the Internet Protocol Multimedia Subsystem network, the overall path delay measurement comprises a first measurement and a second measurement, the first measurement comprises a first measured echo delay between the first media server and at least one of the first user device or a session border controller interfaced with the first user device, and the second measurement comprises a second measured echo delay between the first media server and a media gateway, the media gateway communicatively coupling the second user device with the Internet Protocol Multimedia Subsystem network.

6. A method as defined in claim 1 further comprising providing identification information for use in inserting the first media server in a media stream comprising the call to perform surveillance of the call.

7. A method as defined in claim 6 wherein the identification information is used to configure the first media server to duplicate call content included in the media stream and to route the duplicated call content to an intercept gateway to perform surveillance of the call.

8. A method as defined in claim 6 wherein the identification information is used to configure the first media server to detect dual tone multi-frequency digits included in the media stream and to route the detected dual tone multi-frequency digits to an intercept gateway to perform surveillance of the call.

9. A method as defined in claim 1 wherein determining the overall path delay measurement is performed in response to a Session Initiation Protocol message associated with establishing the call for the first user device.

10. A method to perform call surveillance in a communication network, the method comprising:
   querying, using a processor, a processing function to cause a media server to be selected from a plurality of media servers to monitor a call for a user device in an Internet Protocol Multimedia Subsystem network, the media server being selected by the processing function based on a plurality of path delays, wherein each path delay being associated with monitoring the call by a respective one of the plurality of media servers; and
   causing, using the processor, the selected media server to process a media stream associated with the call to monitor the call.

11. A method as defined in claim 10 further comprising obtaining identification information for the selected media server in response to querying the processing function.

12. A method as defined in claim 11 wherein the processing function is a first processing function, and wherein causing the selected media server to process the media stream associated with the call comprises invoking a second processing function with the identification information to cause the selected media server to be inserted in the media stream and to be configured to copy at least a portion of the media stream for transmission to a monitoring gateway.

13. A method to perform call surveillance in a communication network, the method comprising:
   determining, using a processor, a first measurement representative of a first path delay between a first user device and a first media server in an Internet Protocol Multimedia Subsystem network;
   determining, using the processor, a second measurement representative of a second path delay between a second user device and the first media server;
   determining, using the processor, a third measurement based on the first measurement and the second measurement; and
   providing the third measurement to a processing function for use in determining whether to perform surveillance of a call between the first user device and the second user device with one of the first media server or a second media server.

14. A method to configure a media server to perform call surveillance in a communication network, the method comprising:
   obtaining, at a processor, identification information corresponding to a media server selected to perform surveillance of a call between a first user device and a second user device in an Internet Protocol Multimedia Subsystem network, the media server being selected from a plurality of media servers based on a plurality of path delays, each path delay being associated with monitoring the call by a respective one of the plurality of media servers; and
   using the identification information obtained at the processor to configure the selected media server to at least one of duplicate call content or detect dual tone multi-frequency digits included in a media stream comprising the call to perform surveillance of the call.

15. A method to report call surveillance data obtained by a media server in a communication network, the method comprising:
   obtaining, at a processor, surveillance data from a media server selected to perform surveillance of a call between a first user device and a second user device in an Internet Protocol Multimedia Subsystem network, the media server being selected from a plurality of media servers based on a plurality of path delays, each path delay being associated with monitoring the call by a respective one of the plurality of media servers; and
   converting, at the processor, the surveillance data into a specified reporting format.

* * * * *